United States Patent [19]

Shiratori et al.

[11] Patent Number: 5,758,111
[45] Date of Patent: May 26, 1998

[54] DATA PROCESSING APPARATUS FOR EXECUTING DATA PROCESSING USING WINDOWS DISPLAYED ON A DISPLAY APPARATUS

[75] Inventors: Shigeo Shiratori; Masao Akiyoshi; Kimikazu Furukawa, all of Kawasaki, Japan

[73] Assignee: Fujitsu Limited, Kawasaki, Japan

[21] Appl. No.: 504,498

[22] Filed: Jul. 20, 1995

[30] Foreign Application Priority Data

Jul. 20, 1994 [JP] Japan .................. 6-167881

[51] Int. Cl.⁶ .................................................. G06F 3/14
[52] U.S. Cl. .................. 395/342; 395/346; 395/340; 395/345
[58] Field of Search .................. 395/342, 340, 395/346, 345, 344, 347, 975; 345/119, 120

[56] References Cited

U.S. PATENT DOCUMENTS

| | | | |
|---|---|---|---|
| 5,060,170 | 10/1991 | Bourgeois et al. | 395/342 |
| 5,230,063 | 7/1993 | Hoeber et al. | 345/119 X |
| 5,412,776 | 5/1995 | Bloomfield et al. | 395/346 |
| 5,430,839 | 7/1995 | Jagannathan et al. | 395/345 X |
| 5,487,143 | 1/1996 | Southgate | 395/342 |
| 5,577,187 | 11/1996 | Mariani | 395/342 |
| 5,590,265 | 12/1996 | Nakazawa | 395/340 |

FOREIGN PATENT DOCUMENTS

| | | |
|---|---|---|
| 2-028716 | 1/1990 | Japan . |
| 2-300924 | 12/1990 | Japan . |
| 3-005816 | 1/1991 | Japan . |
| 3-172891 | 7/1991 | Japan . |
| 4-152388 | 5/1992 | Japan . |
| 5-080968 | 4/1993 | Japan . |
| 6-067833 | 3/1994 | Japan . |
| 6-096080 | 4/1994 | Japan . |

*Primary Examiner*—Raymond J. Bayerl
*Attorney, Agent, or Firm*—Staas & Halsey

[57] ABSTRACT

A data processing apparatus connected to at least one input apparatus and a display apparatus and including a window control unit and a data processing unit for executing data processing using one or more windows displayed on the display apparatus, and the window control unit includes; a first detecting unit for detecting the presence or absence of at least one window; a first window generating unit for providing a process selecting window which includes various menus to be selected by a user; and a first erasing unit for erasing the process selecting window; wherein when the first detecting unit detects no window on the display apparatus, the first window generating unit provides the process selecting window on the display apparatus, and when the first detecting unit detect any window, except for the process selecting window, the first erasing unit erases the process selecting window from the display apparatus.

20 Claims, 24 Drawing Sheets

Fig. 6

| NUMBER OF WINDOWS | DISPLAY COORDINATE | SIZE | DISPLAY COORDINATE | SIZE | DISPLAY COORDINATE | SIZE | DISPLAY COORDINATE | SIZE | DISPLAY COORDINATE | SIZE |
|---|---|---|---|---|---|---|---|---|---|---|
| 1 | 0 | 120 | | | | | | | | |
| 2 | 0 | 60 | 60 | 60 | | | | | | |
| 3 | 0 | 40 | 30 | 40 | 80 | 40 | | | | |
| 4 | 0 | 30 | 30 | 30 | 60 | 30 | 90 | 30 | | |
| 5 | | | | | | | | | | |

Fig.15
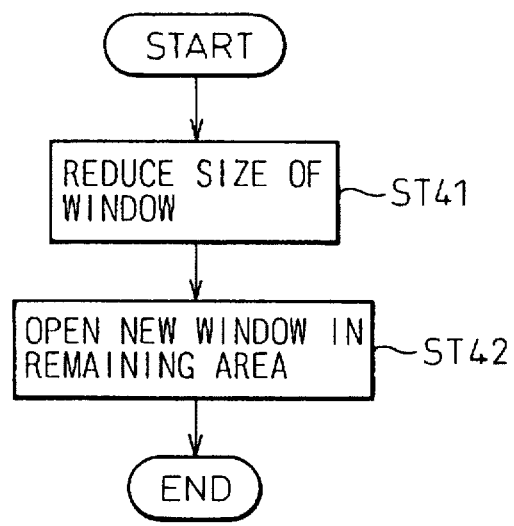
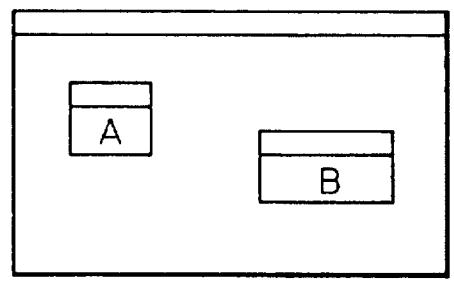
Fig.16A
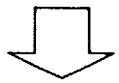
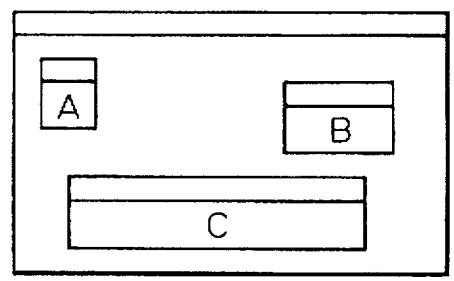
Fig.16B

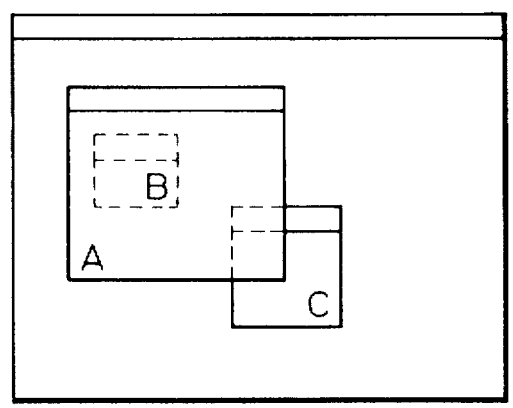
Fig.29A
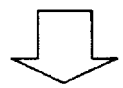
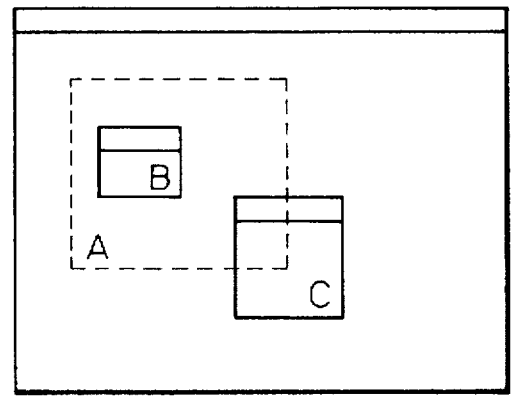
Fig.29B

DATA PROCESSING APPARATUS FOR EXECUTING DATA PROCESSING USING WINDOWS DISPLAYED ON A DISPLAY APPARATUS

BACKGROUND OF THE INVENTION

1. Field of the Invention

The present invention relates to a data processing apparatus for executing data processing using windows displayed on a display apparatus. The present invention is advantageous in that it improves the operability of the windows.

2. Description of the Related Art

Data processing systems, which execute data processing using windows displayed on a display apparatus, are widely utilized in information processing systems. In order to raise the efficiency of the practical use of a data processing apparatus, it is necessary to provide an improved window control function, which can improve the operability of the windows, in the data processing apparatus.

In general, a window (or, windows) is displayed on, or removed from, the display apparatus by using a mouse operated by a user. For example, when a plurality of windows are displayed and when one of them is to be activated, that window is designated by a mouse cursor through a click-operation by the user.

There are, however, many problems, particularly, bad operability of window in use of the mouse in a conventional art. For example, how to reduce a size of window, how to enlarge remaining windows, how to display windows which are hidden by a front window, how to move windows separately or as one group to another area, etc., are very troublesome for users who are relatively unskilled in handling the data processing system.

Accordingly, it is necessary to improve operability of the windows in order to raise efficiency in practical use of a data processing system.

SUMMARY OF THE INVENTION

The object of the present invention is to provide a data processing apparatus for executing data processing using windows and enabling high operability of the windows even if a user is unskilled in handling the apparatus.

In accordance with the present invention, there is provided a data processing apparatus connected to at least one input apparatus and a display apparatus and including a window control unit and a data processing unit for executing data processing using one or more windows displayed on the display apparatus, and the window control unit including:

a first detecting unit for detecting the presence or absence of at least one window;

a first window generating unit operatively connected to the first detecting unit for providing a particular window, for example, a process selecting window which includes various menus to be selected by a user; and a first erasing unit operatively connected to the first window generating unit for erasing the particular window;

wherein when the first detecting unit detects no windows on the display apparatus, the first window generating unit provides the particular window on the display apparatus, and when the first detecting unit detects other windows except for the particular window, the first erasing unit erases the particular window from the display apparatus.

In a preferred embodiment, the window control unit further includes: a second detecting unit for detecting whether a particular key on the input apparatus is operated by the user, and a second window generating unit operatively connected to the second detecting unit for providing the particular window regardless of the presence or absence of other windows when the second detecting unit detects the particular key.

In another preferred embodiment, the window control unit further includes: a third detecting unit for detecting a switch instruction sent from the input apparatus to switch an active window; a first decision unit operatively connected to the third detecting unit for determining the number of windows displayed on the display apparatus when the third detecting unit detects the switch instruction; a switch unit operatively connected to the decision unit for switching the active window; and a first setting unit operatively connected to the first decision unit for setting the active window; wherein when the number of windows is two, the first setting unit sets another window to an active state, and when the number of windows exceeds three, the first setting unit sets any one of windows designated by the input apparatus to the active state.

In still another preferred embodiment, the first setting unit displays an identification list of windows which are currently displayed, and selects any one of the windows in the identification list to be activated through the input apparatus to set the active window.

In still another preferred embodiment, the first setting unit eliminates a read only window from the active window.

In still another preferred embodiment, the window control unit further includes: a fourth detecting unit for detecting a new instruction to provide a new window; a reducing unit operatively connected to the fourth detecting unit for reducing the size of each of the windows which are currently displayed when the fourth detecting unit detects the new window; and a third window generating unit operatively connected to the reducing unit for providing the new window in a remaining area which is obtained after the reduction of windows by the reducing unit.

In still another preferred embodiment, the reducing unit reduces the size of each window by taking into account the arrangement of each window on the display apparatus.

In still another preferred embodiment, the window control unit further includes; a fifth detecting unit for detecting an erase instruction to erase the window; a second erasing unit operatively connected to the fifth detecting unit for erasing the window in which the erase instruction is generated when the fifth detecting unit detects the erase instruction; and an enlarging unit operatively connected to the second decision unit for enlarging the windows which are not erased.

In still another preferred embodiment, the enlarging unit enlarges the size of each window by taking into account the arrangement of each window on the display apparatus.

In still another preferred embodiment, the window control unit further includes a second decision unit operatively connected to the second erasing unit and the enlarging unit for determining whether the window to be erased is a last displayed window, and the enlarging unit enlarges windows which were not erased in the just previous state when the last displayed window was opened.

In still another preferred embodiment, the window control unit further includes: a second setting unit for setting an automatic adjusting mode for the automatic adjustment of the distance between windows; a defining unit operatively connected to the second setting unit for defining a pair of windows for which the absolute distance between the pair of windows becomes a predetermined value when the second setting unit sets the automatic adjusting mode; and an adjusting unit operatively connected to the defining unit for adjusting the absolute distance so as to become zero between the pair of windows.

In still another preferred embodiment, the window control unit further includes: a third setting unit for setting a one-group moving mode in which a plurality of windows move as one group in response to an one-group moving instruction; a seventh detecting unit connected to the third setting unit for detecting whether a moving instruction is generated for any one of the windows in which the one-group moving instructing is generated when the third setting unit sets the one-group moving mode; and a moving unit connected to the seventh detecting unit for moving a plurality of windows as one group when the seventh detecting unit detects the moving instruction.

In still another preferred embodiment, the window control unit further includes: a fourth setting unit for setting a size-following change mode which sizes of adjacent windows are changed by following each other; a eighth detecting unit operatively connected to the fourth setting unit for detecting whether the window receiving a size-following change instruction has an adjacent window when the size-following change mode is set by the fourth setting unit; and a change unit operatively connected to eighth detecting unit for changing the size of the window which receives the size-following change instruction in a state keeping an adjacent relationship.

In still another preferred embodiment, the window control unit further includes: a fifth setting unit for setting an exchange mode between windows; a ninth detecting unit operatively connected to the fifth setting unit for detecting whether an exchange instruction between windows is generated for any one of the windows to be exchanged when the exchange mode is set by the fifth setting unit; and an exchange unit operatively connected to the ninth detecting unit for exchanging the contents or position between windows to be exchanged when the fifth setting unit detects the exchange instruction.

In still another preferred embodiment, the window control unit further includes: a tenth detecting unit for detecting whether a display instruction to display hidden windows is generated; and a display unit operatively connected to the tenth detecting unit for displaying the contents or a window frame of the window which is hidden by a front window when the tenth detecting unit detects the display instruction of the hidden window.

In still another preferred embodiment, the display unit displays the window frame of the front window when displaying contents of the window which is hidden by the front window.

In still another preferred embodiment, the display unit displays sequentially, or at once, the contents of all the windows which are hidden by the front window.

In still another preferred embodiment, a data processing apparatus is connected to a keyboard, a mouse and a display apparatus; and includes a window managing unit, a window control unit, and a data processing unit for executing data processing using one or more windows displayed on the display apparatus. The window managing unit includes: a plurality of window control blocks each including window management data, such as a title, a display position, a display size, and a display pointer indicating contents of data; and a window master including the number of windows, and a plurality of pointers where each pointer corresponds to a display pointer in the window control block.

BRIEF DESCRIPTION OF THE DRAWINGS

In the drawings:

FIG. 6 is a detailed explanatory view for managing data used in the window managing unit;

FIG. 15 is a process flowchart for a fourth embodiment executed in the window control unit;

FIGS. 16A and 16B are explanatory views of still another example of the window display process;

FIGS. 29A and 29B explanatory views of still another example of the window display process.

DESCRIPTION OF THE PREFERRED EMBODIMENTS

Figure 1:
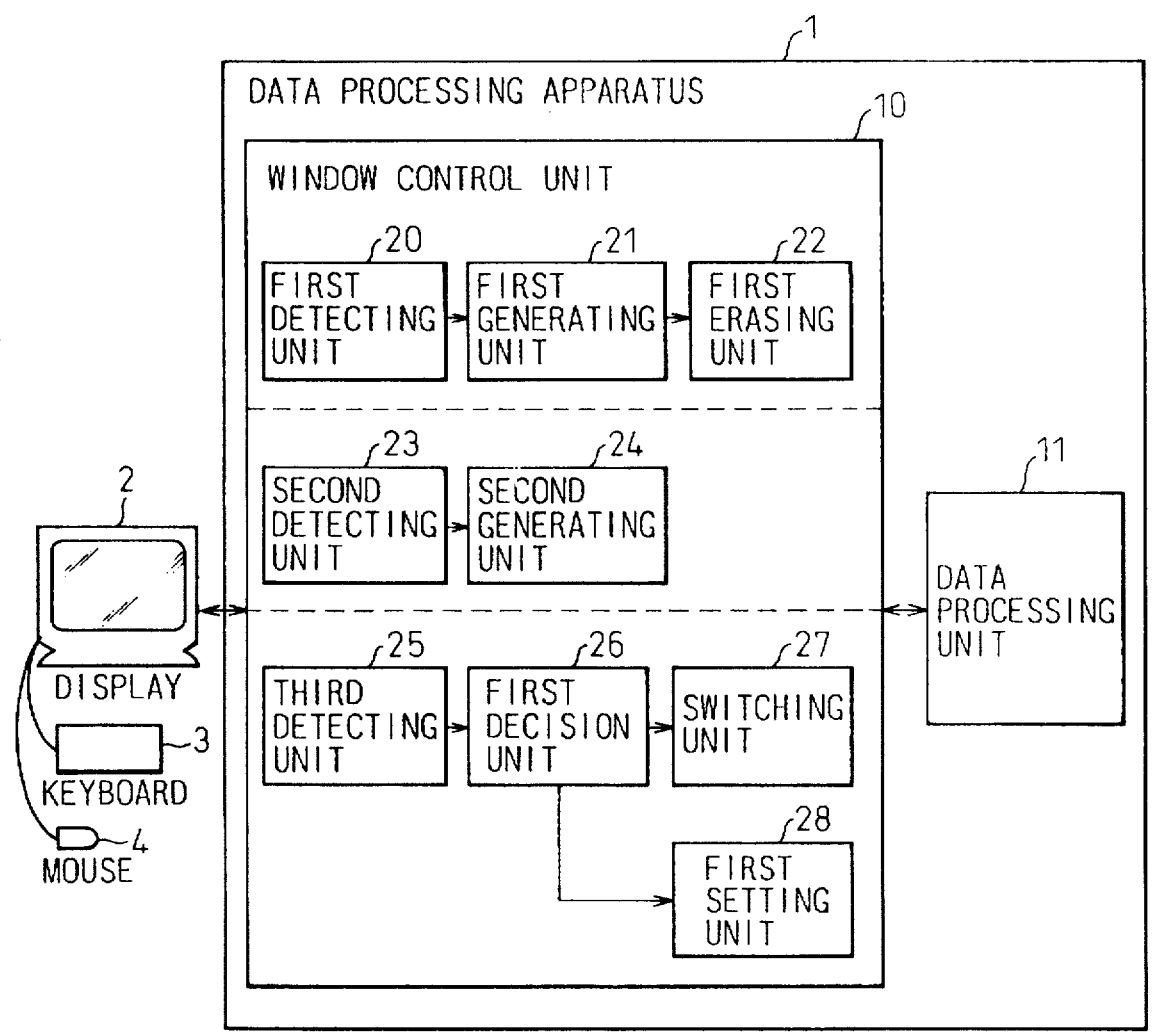
FIG. 1 shows one basic structure of the present invention.
Figure 2:
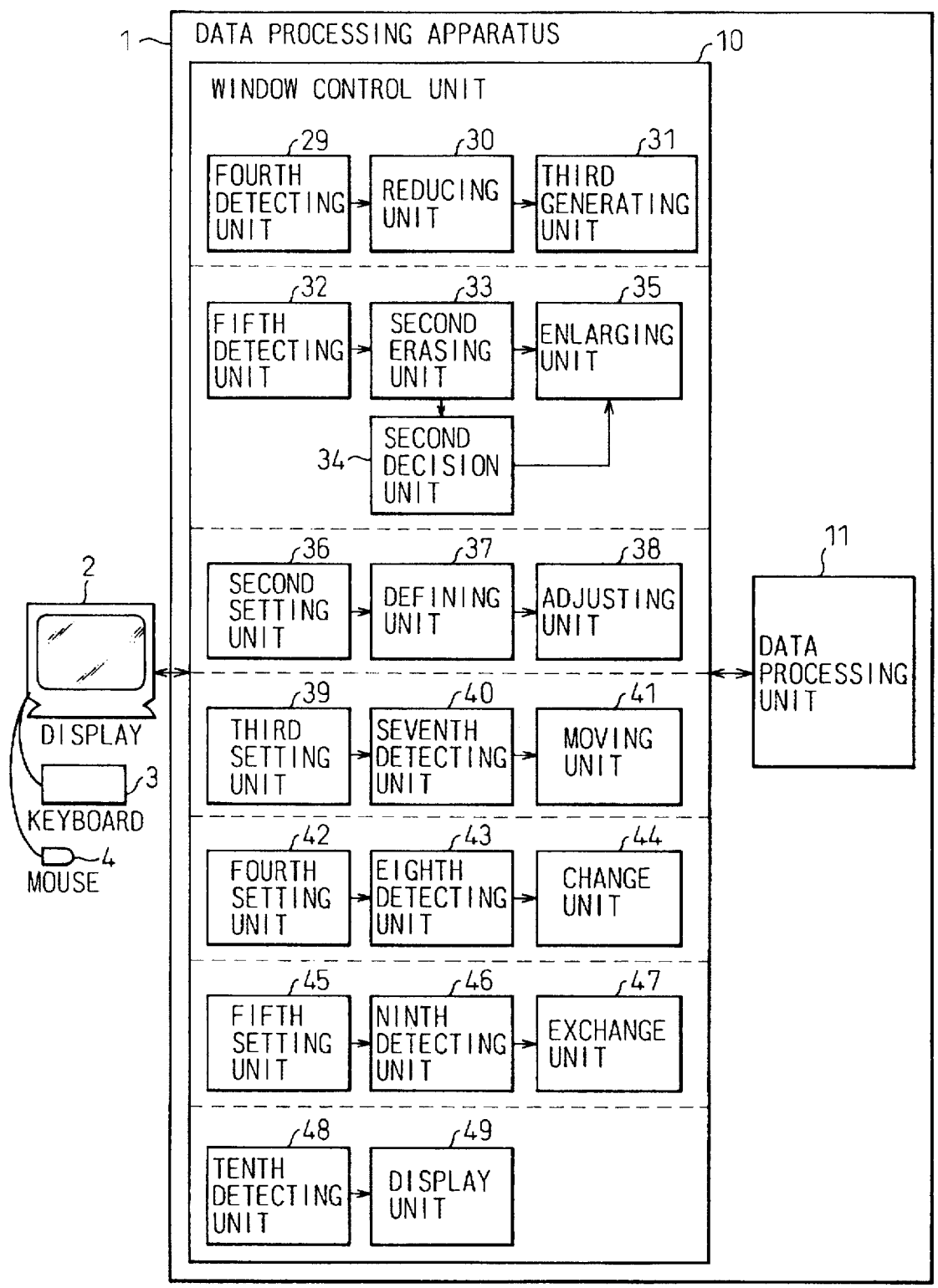
FIG. 2 shows another basic structure of the present invention.

FIG. 1 shows one basic structure of the present invention, and FIG. 2 shows another basic structure of the present invention. In the drawings, reference number 1 denotes a data processing apparatus using the present invention and executing data processing in use of windows displayed on a display apparatus 2. Further, reference number 3 denotes a keyboard and reference number 4 denotes a mouse, and these are operated by a user.

As shown in FIGS. 1 and 2, the data processing apparatus 1 includes a window control unit 10 for controlling display, reduction, movement, enlargement, erasure, etc., of windows in accordance with instructions from the user, and a data processing unit 11 for executing data processing by interacting with the user through the windows.

In order to realize the first embodiment, the window control unit 10 includes a first detecting unit 20 for detecting presence or absence of the display of windows, a first window generating unit 21 for providing a particular window, for example, a process selecting window, and a first erasing unit 22 for erasing the process selecting window.

The first detecting unit 20 detects whether windows are displayed or not. As a result, when no windows are displayed, the first window generating unit 21 provides the process selecting window. The first erasing unit 22 erases the process selecting window when other windows are provided.

Accordingly, when no windows are displayed on the display apparatus, the first window generating unit 21 automatically provides the process selecting window. As a result, it is possible for the user, even if he is unskilled in handling the computer system, to easily execute data processing.

In order to realize the second embodiment, the window control unit 10 includes a second detecting unit 23 for detecting the operation of a particular key, and a second window generating unit 24 for providing a process selecting window.

The second detecting unit 23 detects whether the particular key on the key board 3 is operated or not. As a result, when the particular key is detected, the second window generating unit 24 provides the process selecting window regardless of the presence or absence of a display of other windows.

Accordingly, since the process selecting window is provided in accordance with key operation, it is possible for the user, even if he is unskilled in the handling of a mouse, to easily execute data processing through the window.

In order to realize the third embodiment, the window control unit 10 includes a third detecting unit 25 for detecting an instruction sent from the keyboard to switch an active window, a first decision unit 26 for determining the number of windows displayed, a switch unit 27 for switching the active window to be displayed, and a first setting unit 28 for setting the active window.

The third detecting unit 25 detects whether the instruction to switch the active window is generated through the key operation by the user. As a result, when the instruction is detected, the first decision unit 26 determines whether the displayed windows are two or three. When the number of the windows is two, the switch unit 27 sets the other window to an active state. On the other hand, when the number of windows is three or more, the first setting unit 28 sets the windows designated by the key operation to the active state.

Accordingly, since the active windows are set in accordance with the key operation, it is possible for the user, even if he is unskilled in the operation of the mouse, to easily set the active window to execute data processing.

In order to realize the fourth embodiment, the window control unit 10 includes a fourth detecting unit 29 for detecting an instruction to provide the window, a reducing unit 30 for reducing a size of the window, and a third window generating unit 31 for providing the window.

The fourth detecting unit 29 detects whether an instruction to provide a new window has been issued. As a result, when the instruction is detected, the reducing unit 30 reduces the window which is displayed. When the window is reduced, the third window generating unit 31 provides the new window in the remaining area which is obtained after reduction.

Accordingly, since the new window does not overlap the window which is displayed, it is possible to avoid the problem which is not recognized by the user.

In order to realize the fifth embodiment, the window control unit 10 includes a fifth detecting unit 32 for detecting an instruction to erase the window, a second erasing unit 33 for erasing the window, a second decision unit 34 for determining a kind of window, and an enlarging unit 35 for enlarging the window.

The fifth detecting unit 32 detects whether the instruction to erase a window is generated. As a result, when the instruction is detected, the second erasing unit 33 erases a window. The enlarging unit 35 enlarges the window which is not erased. The decision unit 34 determines whether the erased window is the window which is provided last. As a result, when the window is provided last, the enlarging unit 35 enlarges the window in just previous state in which the erased window is provided.

Accordingly, when the window is erased, the remaining windows are enlarged so as to easily check so that it is possible to eliminate the windows which cannot be recognized by the user.

In order to realize the sixth embodiment, the window control unit 10 includes a second setting unit 36 for setting an automatic adjusting mode for the distance between windows, a defining unit 37 for defining a pair of windows having a relationship between windows, and an adjusting unit 38 for adjusting the distance between windows.

The second setting unit 36 sets the automatic adjusting mode for indicating the automatic adjustment of the distance between windows in response to instructions from the user through the mouse or the keyboard. When the automatic adjusting mode is set, the defining unit 37 determines a pair of windows in which an absolute distance between windows becomes a value smaller than a predetermined threshold value. As a result, the adjusting unit 38 adjusts the absolute distance between pair of windows so as to become zero.

Accordingly, since the absolute distance between pair of windows is adjusted so as to become zero, it is possible to eliminate unnecessary space (i.e., distance) and overlapped portions between windows.

In order to realize the seventh embodiment, the window control unit 10 includes a third setting unit 39 for setting a mode of movement for one group of the windows (one-group moving mode), a seventh detecting unit 40 for detecting an instruction to move the windows (i.e., moving instruction), and a moving unit 41 for moving the windows.

The third setting unit 39 sets the one-group moving mode in response to the instruction from the user through the mouse or the keyboard. When the one-group moving mode is set, the detecting unit 40 detects whether the moving instruction is generated for any one of the windows in which the one-group movement is indicated. When the moving instruction is detected by the detecting unit 40, the moving unit 41 moves the windows which are designated by the one-group moving mode.

Accordingly, the user can realize the one-group movement for windows which have close relationship with each other.

In order to realize the eighth embodiment, the window control unit 10 includes: a fourth setting unit 42 for setting a size-following change mode which indicates the following changes of size for two windows, for example, one is enlarged and the other is reduced; a eighth detecting unit 43 for detecting whether the window having the size change instruction has an adjacent window; and a change unit 44 for changing the size of the window.

The fourth setting unit 42 sets the size-following change mode which indicates the following change in the size for the adjacent windows in response to the instruction from the user through the mouse or the keyboard. The eighth detecting unit 43 detects whether the window receiving the size changing instruction has adjacent windows. As a result, when the adjacent window is detected, the change unit 44 changes the size of the window receiving the size changing instruction while keeping the relationship between the adjacent windows. Accordingly, the user can realize the change of size of the window while keeping the relationship between the adjacent windows.

In order to realize the ninth embodiment, the window control unit 10 includes a fifth setting unit 45 for setting an exchange mode between windows, a ninth detecting unit 46 for detecting an instruction to exchange between windows, and an exchange unit 47 for exchanging the windows.

The fifth setting unit 45 sets the exchange mode which indicates the exchange of the window in response to the instruction from the user through the mouse or the keyboard. When the exchange mode is set, the ninth detecting unit 46 detects whether an exchange instruction is generated for any one of two windows which receive the exchange instruction. When the exchange instruction is detected, the exchange unit 47 exchanges the positions of the windows or the contents of the windows for the two windows to be exchanged. Accordingly, the user can exchange two windows each other in accordance with a simplified operation.

In order to realize the tenth embodiment, the window control unit 10 includes a tenth detecting unit 48 for detecting an instruction to display a hidden window, and a display unit 49 for displaying the hidden window.

The tenth detecting unit 48 detects whether a display instruction for the hidden window is generated. When the display instruction is generated, the display unit 49 displays the content or a window frame of the window which is hidden by a front window, and further displays only the window frame of the front window. Accordingly, since the hidden window which is hidden by the front window is displayed, the user can easily recognize the contents of the hidden window.

Figure 3:
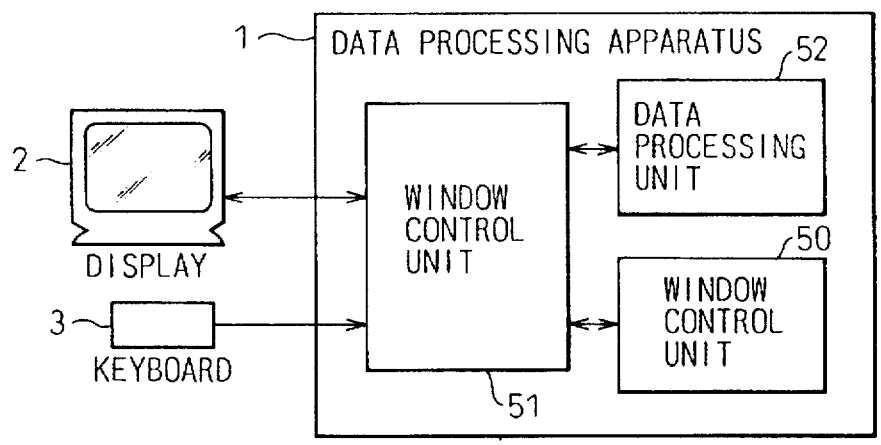
FIG. 3 shows one example of a data processing apparatus using the present invention.

FIG. 3 shows one example of a data processing apparatus using the present invention. As shown in the drawing, the data processing apparatus 1 using the present invention is connected to a display apparatus 2 and a keyboard 3. The data processing apparatus 1 includes: a window managing unit 50 for managing an attribute of the window displayed on the display apparatus 2; a window control unit 51 for accessing management data stored in the window managing unit 50 and executing control of the window; and a data processing unit 52 for executing data processing by interacting with the user through the window displayed on the display apparatus 2.

As is obvious, the present invention can be realized by the window control unit 51.

Figure 4:
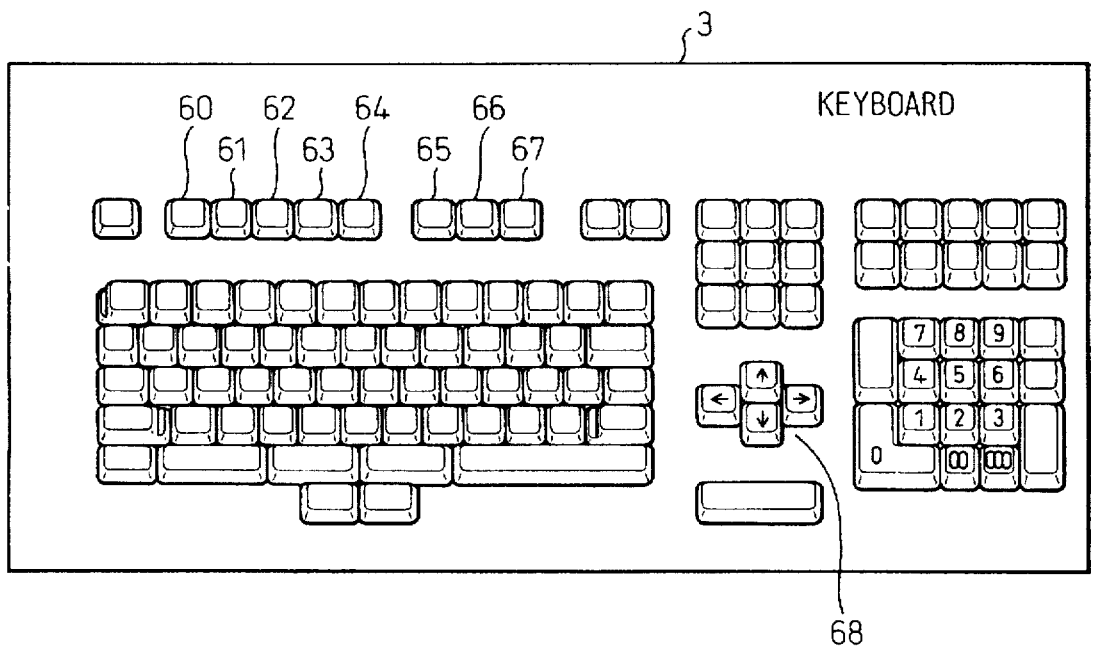
FIG. 4 shows one example of a keyboard used in the data processing apparatus shown in FIG. 3.

FIG. 4 shows one example of the keyboard used in the data processing apparatus shown in FIG. 3. As shown in the drawing, the keyboard 3 includes: a process selecting key 60 for instructing provision (i.e., display) of the process selecting window; an active switching key 61 for instructing switching of the active window; an automatic adjusting key 62 for instructing adjustment of the distance between windows; a key 63 for moving windows as one group; a size following change key 64 for instructing the following change of the adjacent window; an exchange key 65 for instructing exchange of the windows; a background display key 66 for instructing display of the hidden window; and a background erasing key 67 for instructing erasure of the background window. Further, reference number 68 denotes cursor moving keys.

Figure 5:
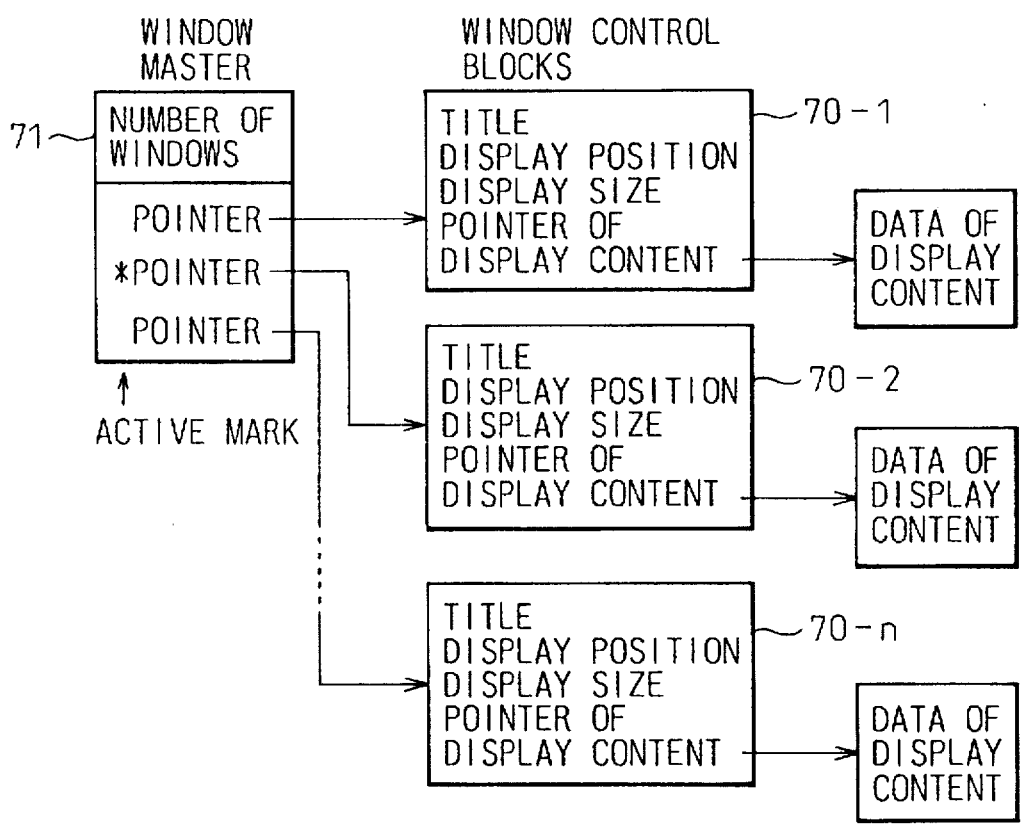
FIG. 5 is an explanatory view for managing data used in a window managing unit shown in FIG. 3.

FIG. 5 is an explanatory view of managing data used in a window managing unit shown in FIG. 3. As shown in the drawing, the window managing unit 50 includes a plurality of window control blocks 70-1 to 70-n each provided corresponding to pointer in a window master 71. Each window control block 70 includes management data, such as a title, a display position, a display size and a display content pointer.

In this embodiment, the window control block 70-n is used for controlling the process selecting window. The window managing unit 50 manages the data in each window control block 70. The window master 71 includes the window number and a plurality of pointers. The window managing unit 50 manages pointers in the window master 71 and manages which window is set to the active state.

FIG. 6 is a detailed explanatory view of managing data used in the window managing unit. The window managing unit 50 manages the display coordinate and the display size, in order to realize arrangements in which the windows are not overlapped. Further, the window control block 70 in the window managing unit 50 manages the display position of the window using, for example, the coordinate of a left corner of the window.

Figure 7:
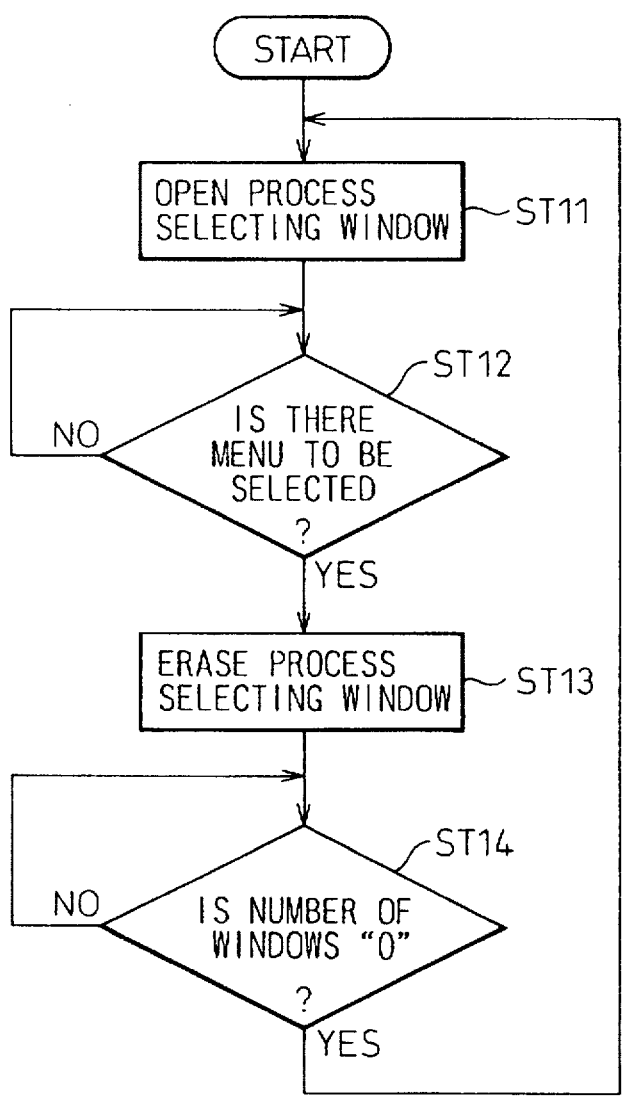
FIG. 7 is a process flowchart for a first embodiment executed in a window control unit.
Figure 8:
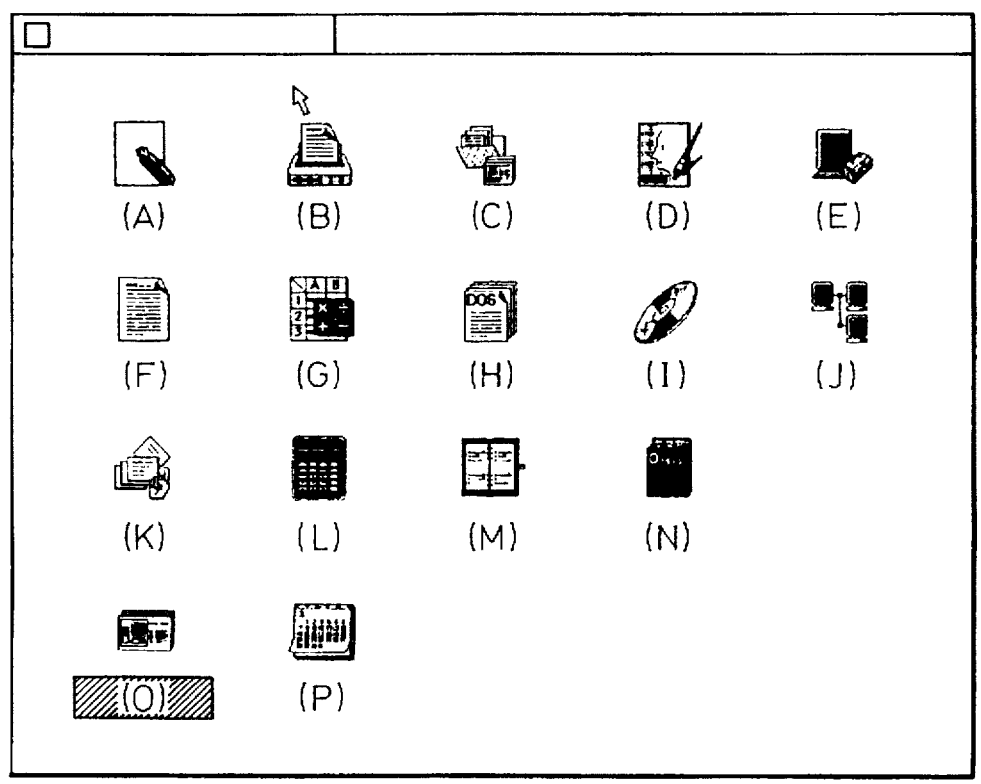
FIG. 8 shows one example of a process selecting window.

FIG. 7 is a process flowchart for a first embodiment executed in a window control unit, and FIG. 8 shows one example of the process selecting window displayed on the display apparatus. In FIG. 8, each of icons has the following meaning: (A): document preparation, (B): print, (C): file management, (E): option system, (F): document update, (G): calc, (H): refer to DOS, (I): search CD-ROM, (J): LAN, (K): secondary, (L): calculator, (M): schedule, (N): refer to dictionary, (O): setting of environment, and (P): calender.

In step ST11, the window control unit 51 opens (i.e., displays) the process selecting window on the display apparatus 2. That is, the window master 71 in the window managing unit 50 selects one of pointers in order to set the window control block 70 so that it is possible to display the process selecting window on the display apparatus 2.

In step ST12, the user selects one of menus to be processed in the process selecting window shown in FIG. 8 using the cursor moving key 68.

In step ST13, when one of menus is selected, the process selecting window is erased by the first erasing unit 22. The erasing operation is executed by erasing the pointer indicating the window control block 70 which is pointed by the window master 71. That is, when one of menus is selected in the process selecting window, the data processing unit 52 provides the window to execute data processing so that unnecessary window is erased.

In step ST14, the first detecting unit 20 detects whether the number of the windows which are displayed now became "zero" during data processing in the data processing unit 52. When the detecting unit 20 detects that the number of the windows become "zero" on the display apparatus 2, i.e., none of windows is displayed on the display apparatus, the process returns to the step ST12 and the process selecting window is displayed again on the display apparatus. This detection is executed whether or not the number of the window control block 70 pointed by the window master 71 is "zero".

As explained above, in the first embodiment, when none of windows is displayed on the display apparatus 2, the process selecting window is automatically displayed on the display apparatus 2. Accordingly, users who are unskilled in handling of the computer, can easily realize the data processing through the windows.

Figure 9:
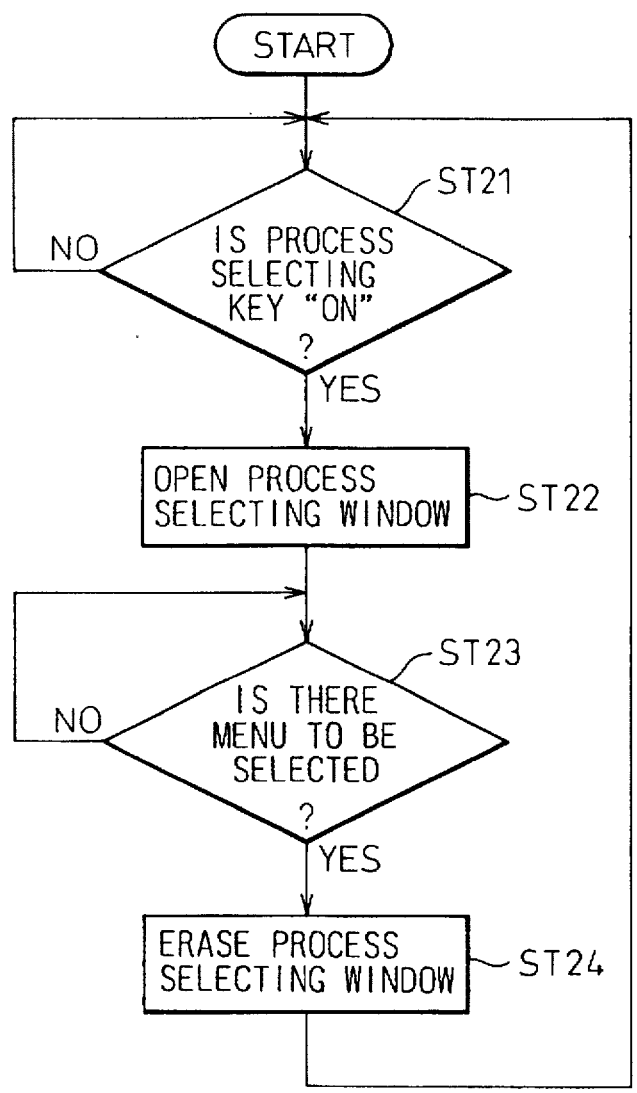
FIG. 9 is a process flowchart for a second embodiment executed in the window control unit.
Figure 10:
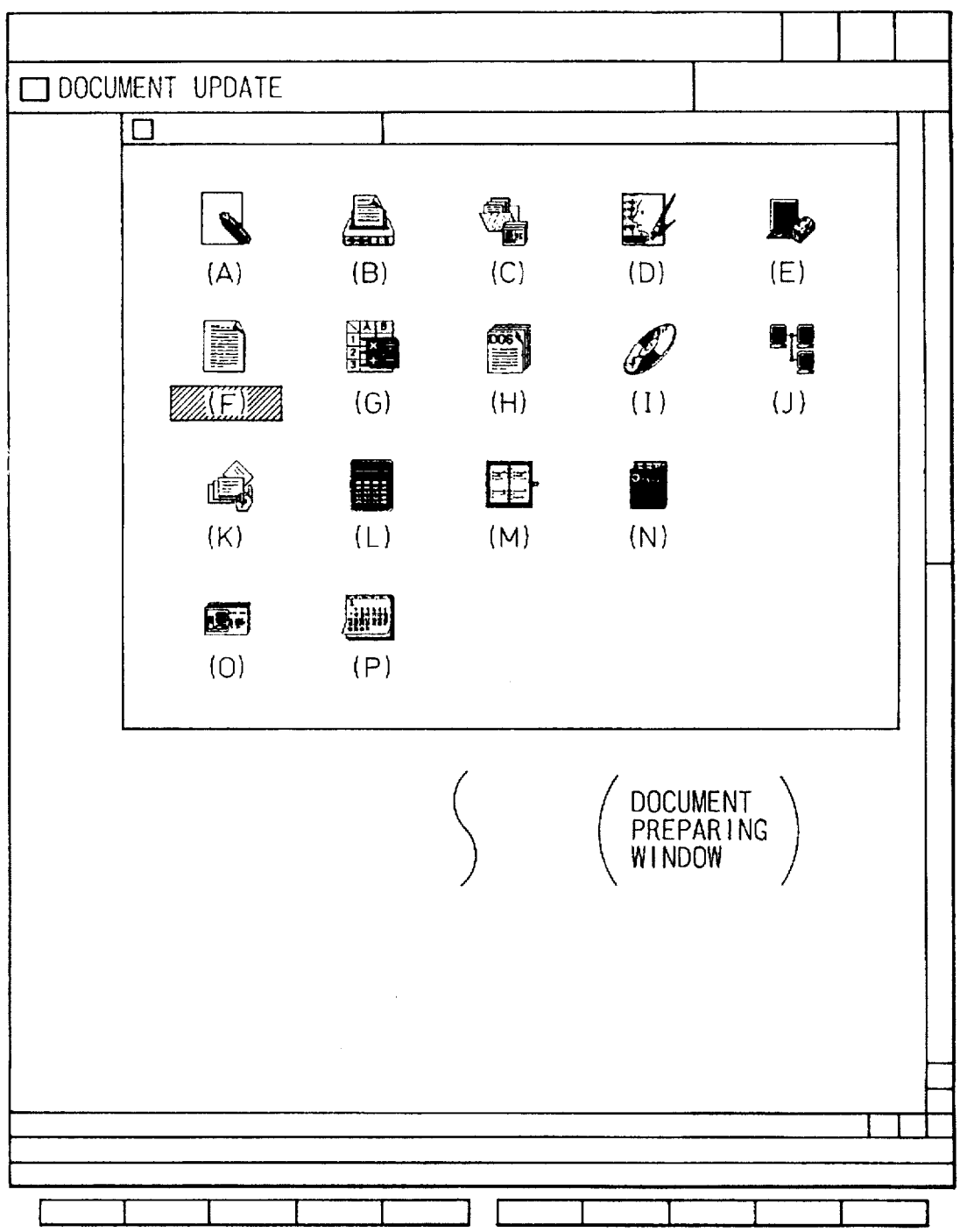
FIG. 10 is an explanatory view of one example of display process in the process selecting window.

FIG. 9 is a process flowchart for the second embodiment executed in a window control unit, and FIG. 10 is an explanatory view of one example of display process in the process selecting window.

In step ST21, the second detecting unit 23 detects whether the process selecting key (i.e., menu key) 60 of the keyboard 3 is pushed.

In step ST22, when the process selecting key 60 is pushed (i.e., ON), the process selecting window is displayed by the second window generating unit 24 on the display apparatus 2. That is, this process is executed in such a way that the window master 71 of the window managing unit 50 points to the window control block 70 to display the process selecting window shown in FIG. 8.

In step ST23, the user selects one of menus (i.e., one of icons) in the process selecting window by using the cursor moving key 68.

In step ST24, when the menu is selected, the process selecting window is erased and the process returns to the step ST21, then, the process selecting key 60 is pushed again. That is, when the menu is selected in the process selecting window, the data processing unit 52 provides the predetermined window and executes data processing on the window. Further, the process selecting window is erased, and the process returns to the step ST21 and the process selecting key 60 is pushed again.

As explained above, during the process of the document generation on the window, the window control unit 51 further displays the process selecting window (see FIG. 8) on the window which is executing now, as shown in FIG. 10, when the process selecting key 60 is pushed again. When any one of the menus is selected, the window which is selected in accordance with the menu is provided and the process selecting window is erased.

In the second embodiment, because the process selecting window is provided in accordance with the key operation, users who are unskilled in operation of the mouse can easily execute data processing.

Figure 11:
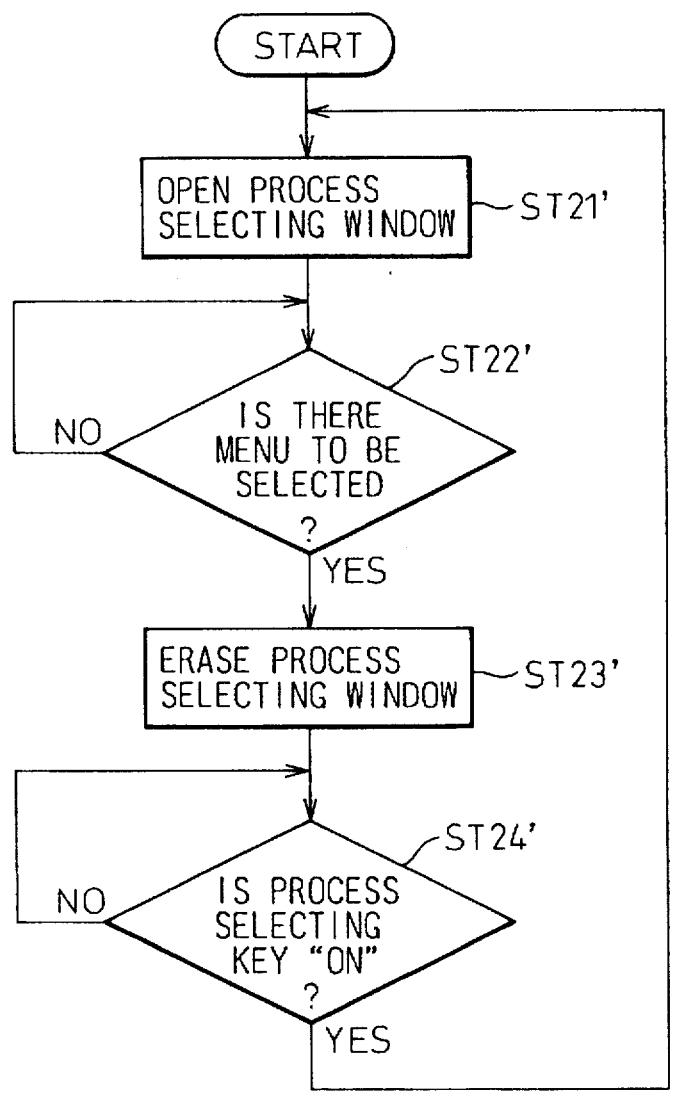
FIG. 11 is another process flowchart for the process selecting window executed in FIG. 9.

FIG. 11 is another process flowchart for the process selecting window executed in FIG. 9. This flowchart shows another example of FIG. 9 based on the first embodiment. In step ST21', when the power is turned on, the process selecting window is automatically provided. In steps ST22' and ST23', when any one of menus is selected in the process selecting window, the process selecting window is erased. In step ST24', the detecting unit detects whether the process selecting key 60 is pushed again. When the process selecting key is pushed, the process selecting window is provided.

Figure 12:
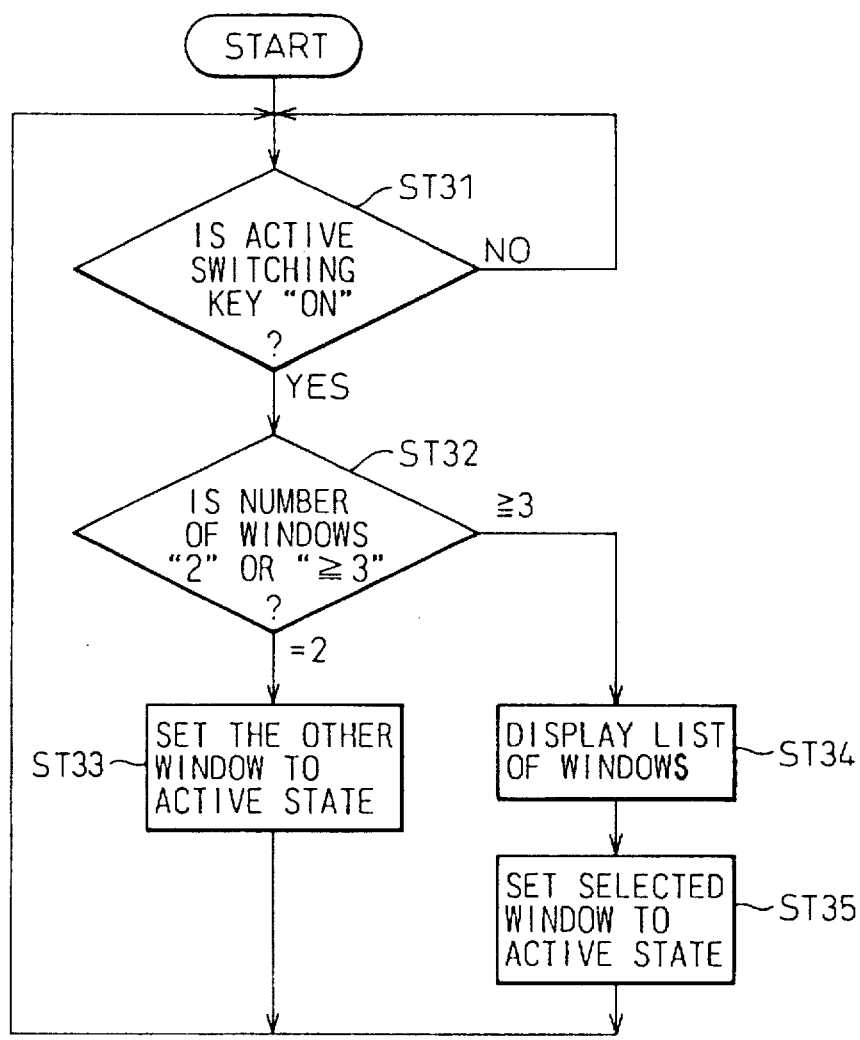
FIG. 12 is a process flowchart for a third embodiment executed in the window control unit.

FIG. 12 is a process flowchart for the third embodiment executed in a window control unit.

In step ST31, the third detecting unit 25 detects whether the active switch key 61 is pushed.

In step ST32, the first decision unit 26 detects whether the number of windows which are displayed now are two or three on the display apparatus 2.

In step ST33, when the number of windows are two, an active window is selected by the cursor so that the other window is set to the active state. Further, the process returns to the step ST31 and the active switch key 61 is pushed again.

In step ST34, when the number of the windows are three, a name list of windows which are displayed now are displayed.

In step ST35, the window to be selected is determined in the name list using the cursor moving keys 68, and the selected window is set to the active state. Further, the process returns to the step ST31 and the active switch key 61 is pushed again.

Figure 13:
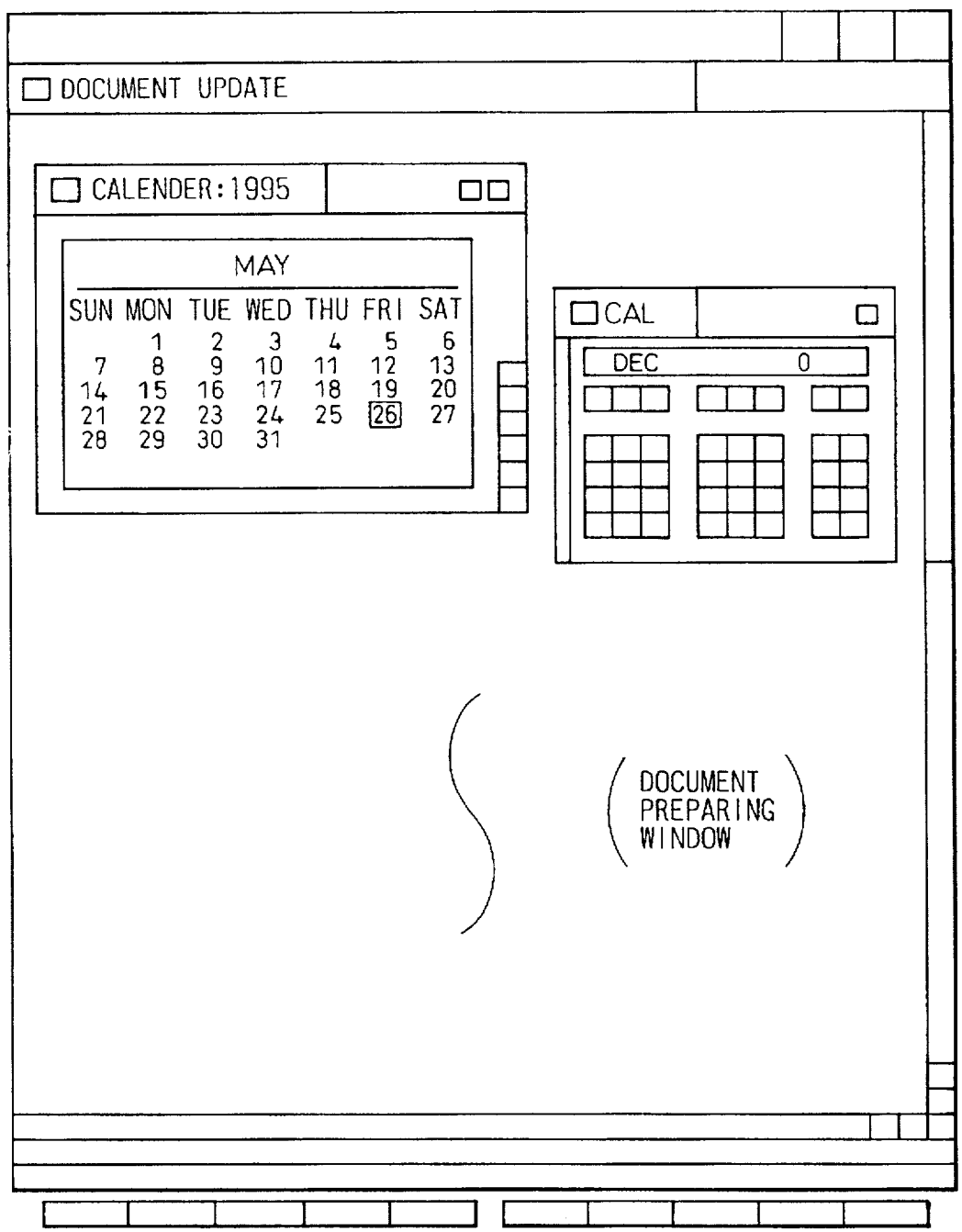
FIG. 13 is an explanatory view of another example of window display process.
Figure 14:
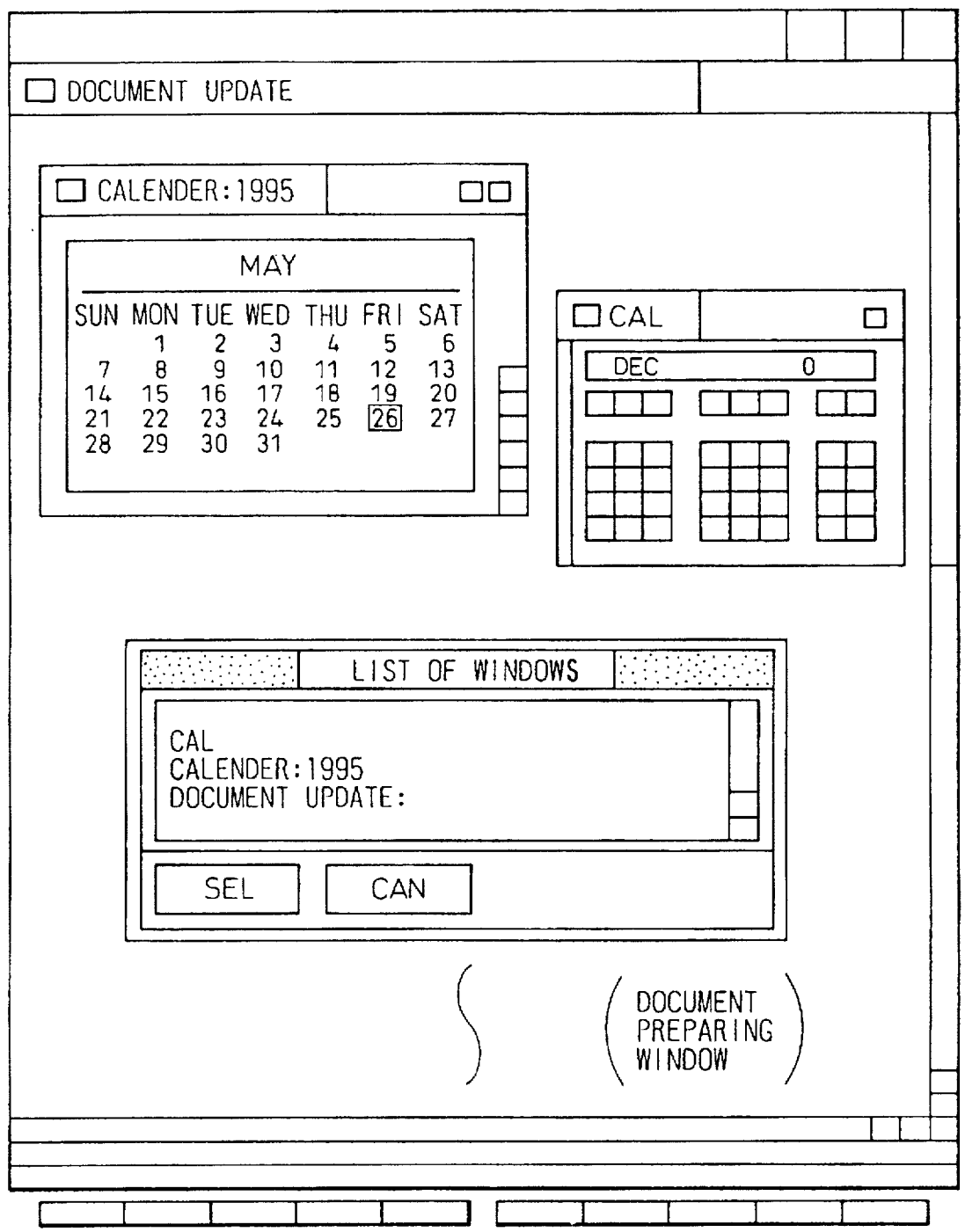
FIG. 14 is an explanatory view of still another example of a window display process.

FIG. 13 is an explanatory view of another example of the window display process, and FIG. 14 is an explanatory view of still another example of a window display process. In FIG. 13, the window of a calender function and the window having a calculator overlap the document generation window. When the user pushes the active switch key 61, a window selecting list having three window names is displayed on the remaining area of the window as shown in FIG. 14. The user selects the name to be activated from the window selecting list so that it is possible to set the window to be activated.

In the above process, when there is a read only window (i.e., a window which cannot be activated by the user, and only reference is possible) in the displayed windows, this read only window is not considered in the above setting operation. That is, each window control block (see FIG. 5) manages the attribute of the window whether it indicates the read only window or the read or write window (i.e., reference and update are possible). Further, the window control unit 51 refers to the window control block 70 which is displayed now, and checks the window whether it is the read only window. As explained above, when it is the read only window, the setting process is not executed to the read only window.

Accordingly, in the third embodiment, the active window is set through a key operation so that the users who are unskilled in the handling of the mouse can execute the data processing. Further, since the window selecting method is changed in accordance with the number of windows which are currently displayed, it is very easy for the user to select the desired window.

FIG. 15 is a process flowchart for a fourth embodiment executed in the window control unit.

In step ST41, a size of the window which is currently displayed is reduced by using the reducing unit 30.

In step ST42, the generating unit 31 provides the window, which the display is instructed, to the remaining area on the display after reduction of the window in step ST41.

FIGS. 16A and 16B are explanatory views of still another example of a window display process. In the drawings, A, B and C are windows. First, the windows A and B are displayed on the display apparatus. In this situation, when the fourth detecting unit 29 detects the display instruction, the reducing unit 30 reduces the windows A and B as shown in FIG. 16A, and the window generating unit 31 provides the window C in the remaining area after reduction of the windows A and B as shown in FIG. 16B.

In the above reducing processes, the reducing unit 30 utilizes the relationship between the display coordinate and the display size based on the number of windows, i.e., the relationship to realize non-overlapped arrangement of the window shown in FIG. 6, and realizes the reducing processes by changing the location of the windows. As another embodiment, it is possible to simply reduce without changing the location of the windows.

In this case, a window reducing rate is determined by, for example, the following two methods. That is, one is determined by uniformly dividing the area into the number of windows to be reduced, and the other is determined by proportionally dividing the areas in accordance with the size of each window to be reduced. As is obvious, the above mentioned area represents an area to be reduced by adding the new window after reduction.

Accordingly, in the fourth embodiment, since the new window to be displayed is provided on the display apparatus without overlapping on the windows which are already displayed, it is possible to eliminate the windows which are not recognized by the user.

Figure 17:
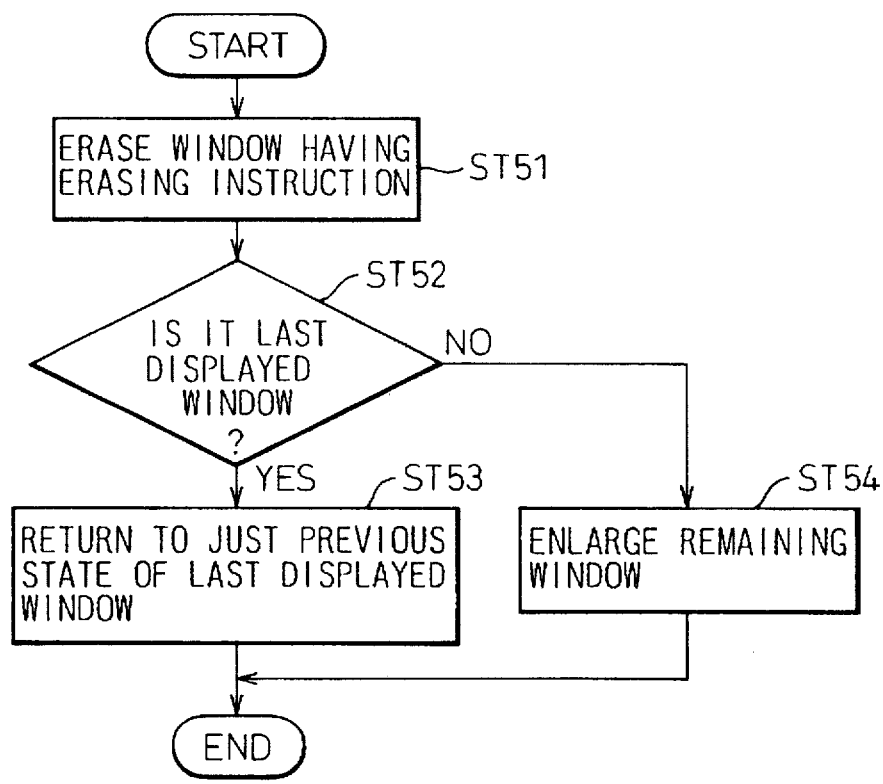
FIG. 17 is a process flowchart for a fifth embodiment executed in the window control unit.

FIG. 17 is a process flowchart for a fifth embodiment executed in a window control unit.

In step ST51, when the fifth detecting unit 32 detects the instruction which erases the window (an erasing instruction), the second erasing unit 33 erases the window.

In step ST52, the second decision unit 34 detects whether the erased window is the last displayed window.

In step ST53, when it is the last displayed window, the display content is returned to the previous display state of the last displayed window.

In step ST54, when it is not the last displayed window, the enlarging unit 35 enlarges the remaining windows which are not erased in accordance with a predetermined algorithm as explained below.

Figure 18:
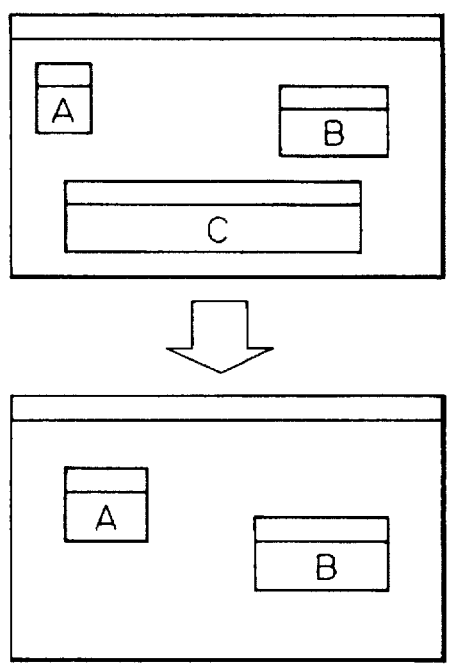
FIG. 18 is an explanatory view of still another example of the window display process.

FIG. 18 is an explanatory view of still another example of a window display process. When the windows A, B and C are displayed on the display apparatus as shown in FIG. 18, and when the fifth detecting unit 32 detects the erasing instruction for the window C, the window C is erased and the windows A and B are enlarged as shown in FIG. 18.

In the above enlarging processes, the enlarging unit 35 utilizes the relationship between the display coordinate and the display size based on the number of windows, i.e., the relationship to realize a non-overlapped arrangement of the windows shown in FIG. 6, and realizes the enlarging processes by changing the location of the windows. As another embodiment, it is possible to simply enlarge without changing the location of the windows.

In this case, a window enlarging rate is determined by, for example, one of the following two methods. That is, one is determined by uniformly allocating the area to each of the windows to be enlarged, and the other is determined by proportionally allocating the area in accordance with the size of each window to be enlarged. As is obvious, the above mentioned area represents an area to be increased after erasure.

Accordingly, in the fifth embodiment, when one window is erased, others windows, which are not erased, are enlarged on the display apparatus. As a result, the user can easily observe all the enlarged windows on the display apparatus.

Figure 19:
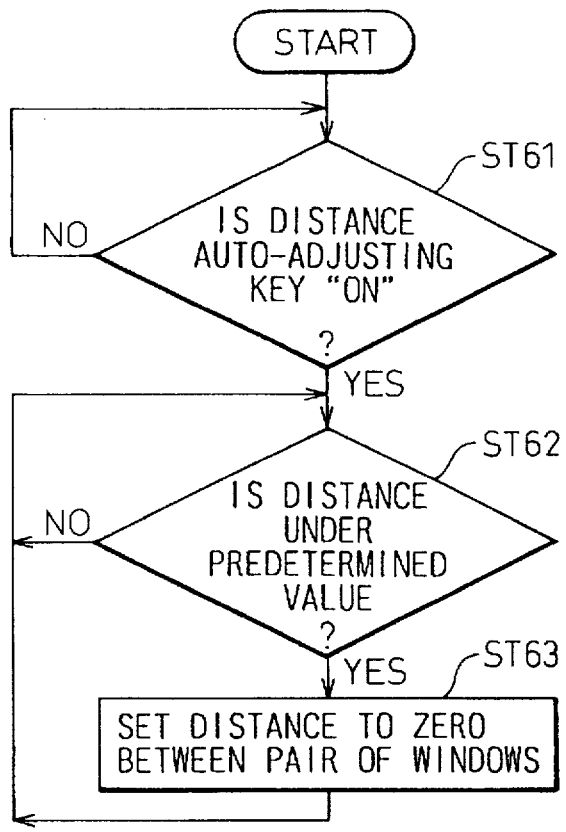
FIG. 19 is a process flowchart for a sixth embodiment executed in the window control unit.

FIG. 19 is a process flowchart for a sixth embodiment executed in a window control unit.

In step ST61, the second setting unit 36 detects whether the distance automatic-adjusting key 62 of the keyboard 3 is pushed.

In step ST62, the defining unit 37 checks whether there are a pair of windows for which an absolute distance between windows is under a predetermined value.

In step ST63, when there is a pair of windows for which the absolute distance between windows is under the predetermined value, the adjusting unit 38 moves one of windows and adjusts the distance between the pair of windows to zero.

Figure 20:
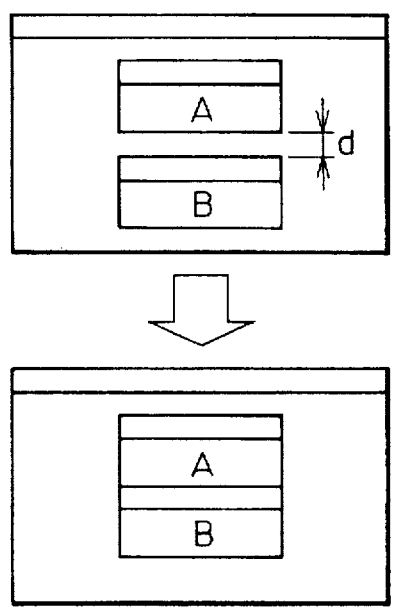
FIG. 20 is an explanatory view of still another example of the window display process.

FIG. 20 is an explanatory view of still another example of a window display process. As shown in FIG. 20, there is a pair of windows A and B, and "d" represents the distance between the windows A and B. When the distance "d" is under a predetermined value, the adjusting unit 38 moves one of windows and adjusts the distance "d" to zero as shown in FIG. 20.

The processes for adjusting the distance are explained in detail below.

The window master 71 (see FIG. 5) stores the windows which are opened (i.e., displayed) and an order of display. The window control block 70 manages the display location and size of all windows displayed. When distance automatic adjusting key 62 is pushed, the window control unit 51 calculates the coordinate of four corners of each window in accordance with the display location and size of all windows displayed. Further, the window control unit 51 calculates the absolute distance between windows and detects whether there are the pair of windows for which the distance is under the predetermined value.

As a result of the check, when there is a pair of windows for which the distance is under the predetermined value, first, the window control unit 51 checks the order of display of two windows, i.e., which window is displayed earlier, in accordance with the data which is managed by the window master 71, and, second, moves one window (the later) to the other window (the earlier) so as to make "d"=zero.

For example, in FIG. 20, when window A is displayed earlier than window B, window B is moved to window A so as to make "d"=zero. In this case, the coordinates of two upper corners of the window B, i.e., the display location of the window B managed by the window control block 70, are changed to the coordinates of two lower corners of the window A.

Accordingly, in the sixth embodiment, since the distance between the pair of windows is adjusted so as to become zero, it is possible to eliminate the unnecessary gap between windows and unnecessary overlapped portions between windows.

Figure 21:
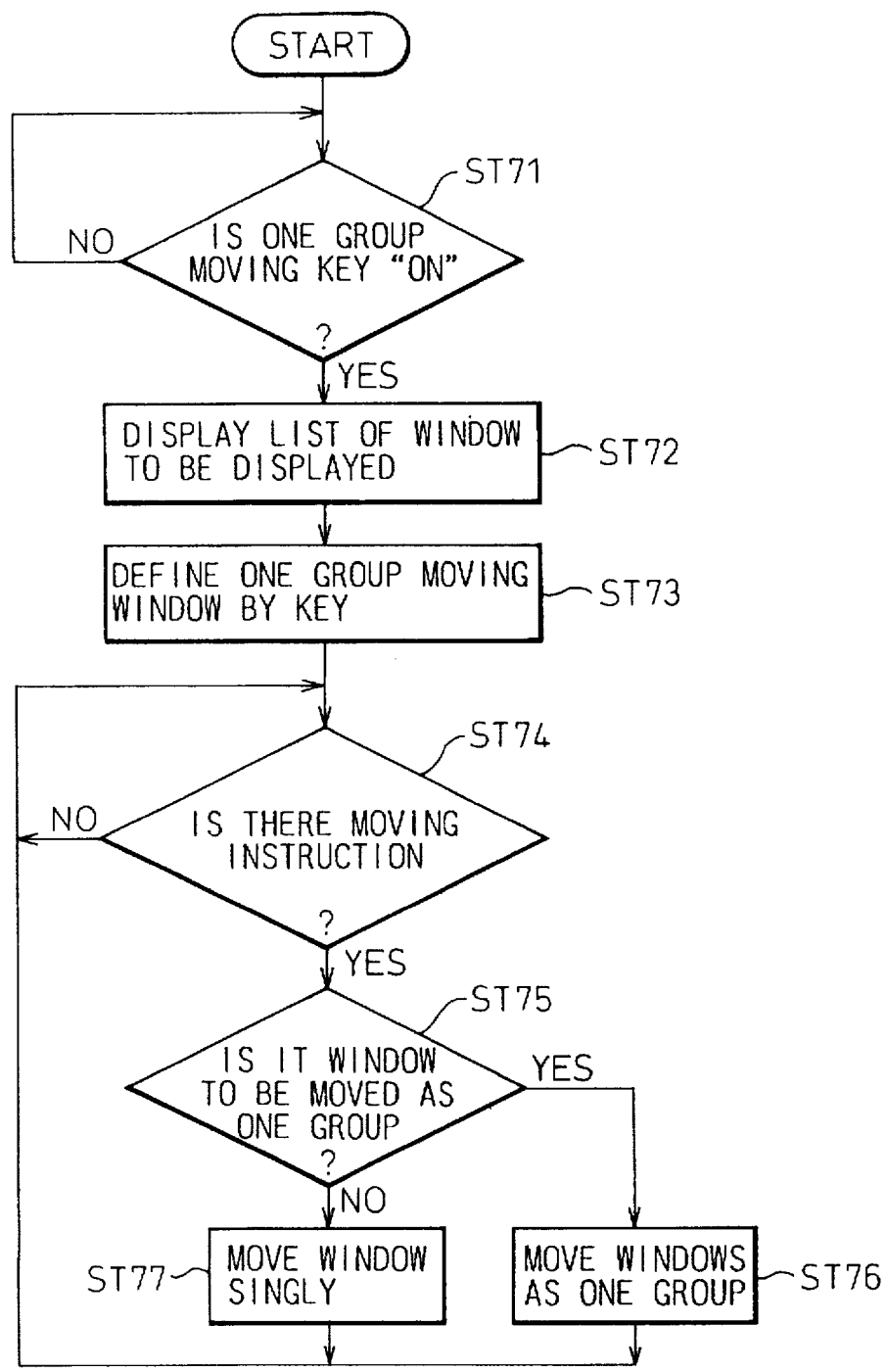
FIG. 21 is a process flowchart for a seventh embodiment executed in the window control unit.

FIG. 21 is a process flowchart for the seventh embodiment executed in the window control unit.

In step ST71, the seventh detecting unit 40 detects whether the key 63 indicating movement as one group (below, one group moving key) is pushed.

In step ST72, the name list (see FIG. 14) of the windows which are displayed is displayed on the display apparatus.

In step ST73, the third setting unit 39 defines the window name to be selected using cursor 68 from the name list, and further defines the windows, which are indicated by the window name, as the windows which move together with another window.

In step ST74, the detecting unit 40 detects whether the moving instruction for the window is generated.

In step ST75, further, the detecting unit 40 detects whether the window to be moved is the one group moving window.

In step ST76, when the window is a one group moving window, the moving unit 41 moves the window together with the other window which is indicated for one group movement.

In step ST77, when the window is not a one group moving window, the moving unit 41 moves only the window which is not indicated as one group movement.

Figure 22A:
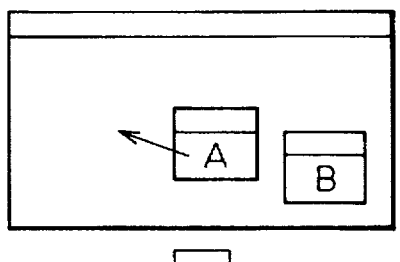
FIGS. 22A and 22B explanatory views of still another example of the window display process.
Figure 22B:
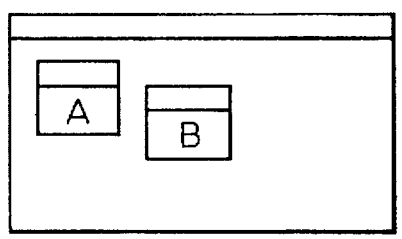

FIGS. 22A and 22B are explanatory views of still another example of a window display process. In FIG. 22A, the windows A and B are moved as one group. That is, when the moving instruction is applied to the window A, the windows A and B are moved as one group.

Accordingly, in the seventh embodiment, the user can move two windows having a close relationship to each other as one group in accordance with a simplified operation.

Figure 23:
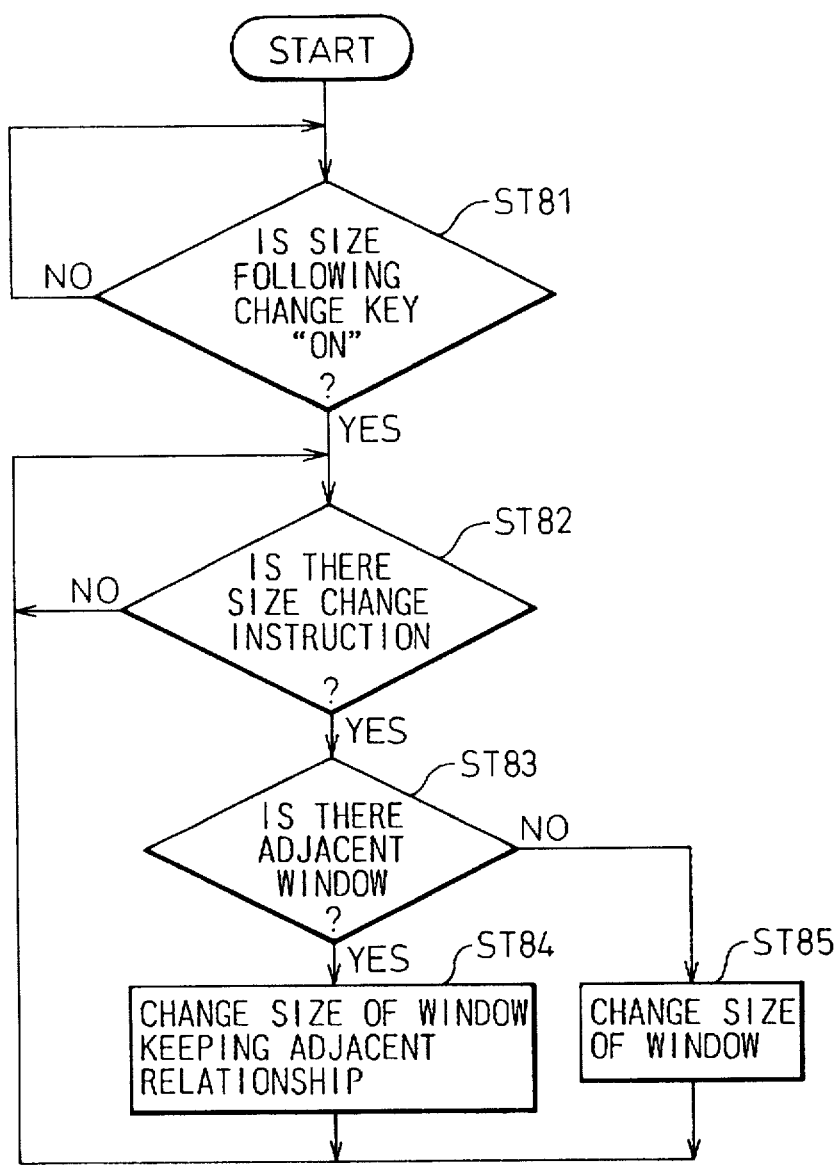
FIG. 23 is a process flowchart for a eighth embodiment executed in the window control unit.

FIG. 23 is a process flowchart for the eighth embodiment executed in a window control unit.

In step ST81, the eighth detecting unit 43 detects whether the size-following change key 64 is pushed.

In step ST82, the eighth detecting unit 43 waits for generation of the size change instruction for the window.

In step ST83, when the eighth detecting unit 43 detects the size change instruction, it further detects whether the window having the size change instruction has an adjacent window. In order to detect the adjacent window, the window control unit 51 calculates the coordinates of four corners of all windows which are displayed on the display apparatus in accordance with the display location and size which are managed by the window control block 70 pointed by the window master 71. Further, the detecting unit 43 detects whether there is the window which is adjacent to the window receiving the size changing instruction.

In step ST84, the changing unit 44 changes the size of the window receiving the size changing instruction. In this case, the adjacent relationship is kept, and the size of the adjacent window is also changed.

In step ST85, when the detecting unit 43 detects that the window has no adjacent window, the change unit 44 changes the size of the one window.

Figure 24A:
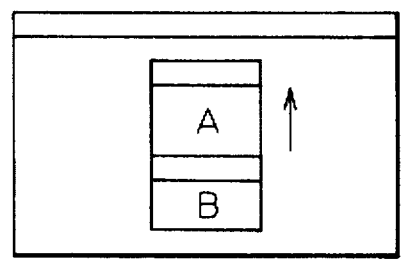
FIGS. 24A and 24B are explanatory views of still another example of the window display process.
Figure 24B:
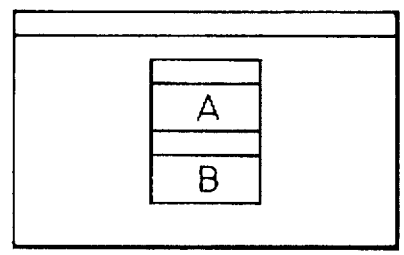

FIGS. 24A and 24B are explanatory views of still another example of a window display process. In these drawings, the window A has the adjacent window B. In the size-following change mode, when the window A receives the size change instruction, the size of the window A is changed in the state that the adjacent relationship is held.

In this case, the gap between the lower end of the window A and the upper end of the window B is held using the calculated coordinates of the window (in FIGS. 24A and 24B, the gap (distance) is zero). Further, the size of the windows A and B is changed (for example, reduced) without changing both positions of the upper end of the window A and the lower end of the window B.

Accordingly, in the eighth embodiment, the user can execute the size changing process of the window under easy operation and holding state of the adjacent window.

Figure 25:
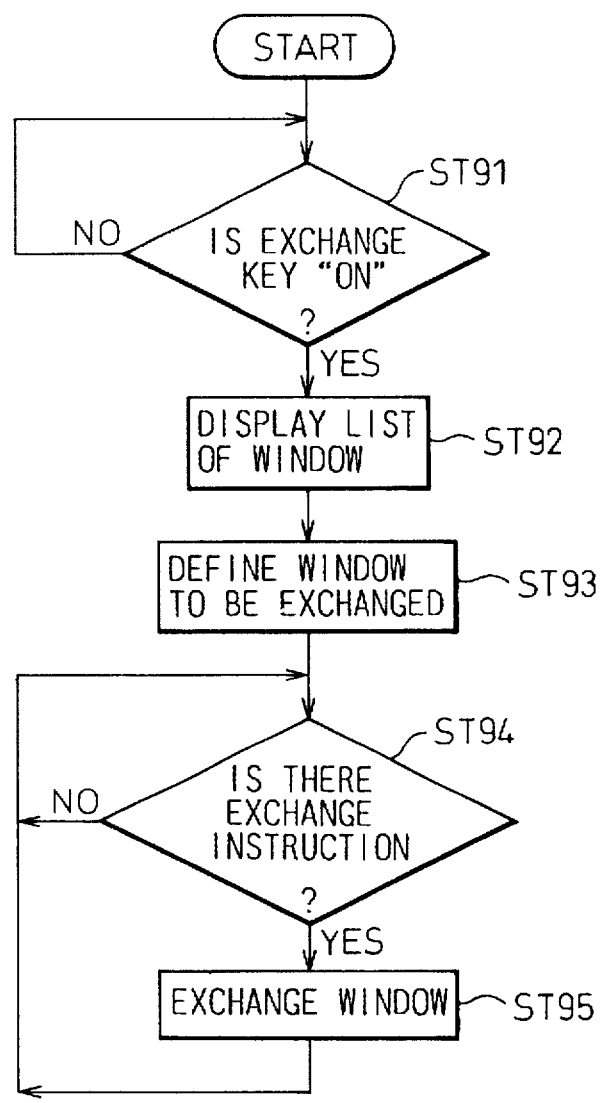
FIG. 25 is a process flowchart for a ninth embodiment executed in the window control unit.

FIG. 25 is a process flowchart for the ninth embodiment executed in a window control unit;

In step ST91, the ninth detecting unit 46 detects whether the exchange key 65 of the keyboard is pushed.

In step ST92, the name list of the windows which are currently displayed is displayed in accordance with the display configuration shown in FIG. 14.

In step ST93, the fifth setting unit 45 defines two window names which are selected from the name list using the cursor moving key 68, and sets two windows indicated by the window name.

In step ST94, the fifth setting unit 45 sets any one of the windows which are designated as the window to be exchanged. The ninth detecting unit 46 detects an exchange instruction for the window which is designated as the window to be exchanged.

In step ST95, the exchange unit 47 exchanges one window for another window and the process returns to the step ST94.

Figure 26A:
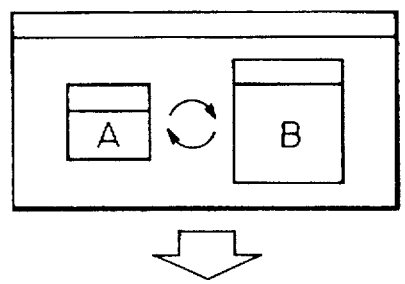
FIGS. 26A and 26B are explanatory views of still another example of the window display process.
Figure 26B:
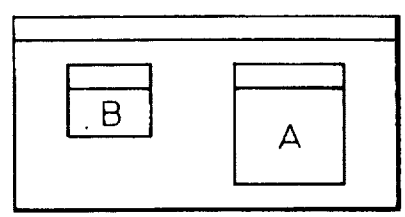
Figure 27A:
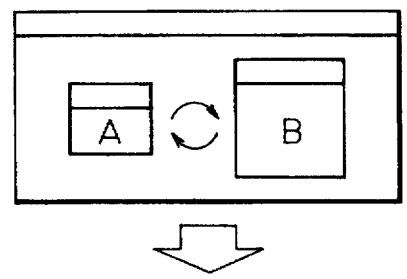
FIGS. 27A and 27B are explanatory views of still another example of the window display process.
Figure 27B:
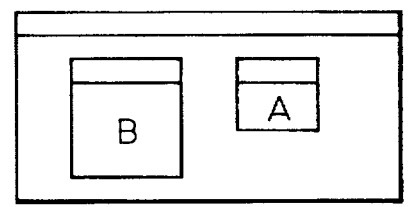

FIGS. 26A and 26B are explanatory views of still another example of a window display process. In FIG. 26A, it is assumed that the position of the window A is to be moved to that of the window B, and on the contrary, the window B is to be moved to the window A. As shown in FIG. 26B, the window A is enlarged and the window B is reduced. In this case, the exchange is executed between the display position and size managed by the window control block 70 of the window A pointed to by the window master 71 and the display position and size managed by the window control block 70 of the window B pointed to by the window master 71 so that the window A and the window B are exchanged each other.

Accordingly, in the ninth embodiment, the user can easily exchange two windows in accordance with an easy operation.

Figure 28:
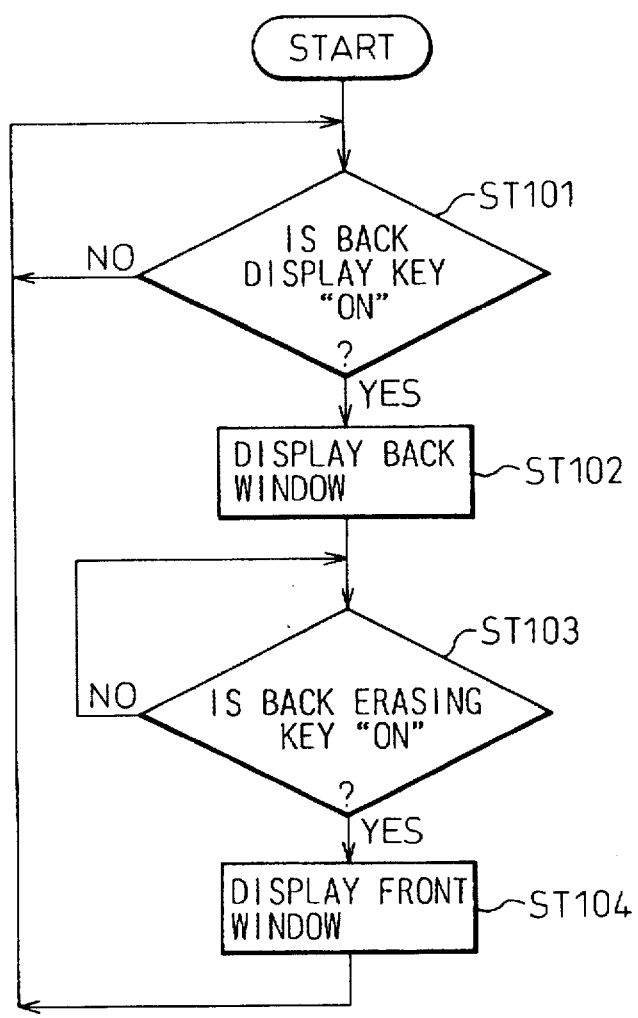
FIG. 28 is a process flowchart for a tenth embodiment executed in the window control unit.

FIG. 28 is a process flowchart for a tenth embodiment executed in a window control unit.

In step ST101, the tenth detecting unit 48 detects whether the hidden display key 66 is pushed.

In step ST102, the display unit 49 erases the front window, and displays the hidden window which was hidden by the front window. Further, the display unit 49 displays only the window frame of the front window. The window frame is obtained by calculating four coordinates of the front window based on the display coordinate and size managed by the window control block 70 of the front window pointed to by the window master 70.

In step ST103, the tenth detecting unit 48 detects whether the hidden window erasing key 67 is pushed.

In step ST104, the display unit 49 erases the hidden window and displays the front window.

FIGS. 29A and 29B are explanatory views of still another example of the window display process. In FIG. 29A, the hidden window B is fully hidden by the front window A, and the window C is partially hidden by the front window A. When the tenth detecting unit 48 detects the display instruction for the hidden windows B and C, the display unit 49 displays only the frame of the front window A so that the windows B and C can be displayed. When many windows are hidden by the front window A, it is possible to display all hidden windows which are hidden by the front window A.

We claim:

1. A data processing apparatus connected to at least one input apparatus and a display apparatus and including a window control unit and a data processing unit executing data processing using one or more windows displayed on said display apparatus, and said window control unit comprising:

a first detecting unit detecting the presence of at least one window or the absence of any window displayed on said display apparatus;

a first window generating unit, operatively connected to said first detecting unit, selectively providing a particular window for display on the display apparatus; and a first erasing unit, operatively connected to said first window generating unit, selectively erasing said particular window;

wherein, when said first detecting unit detects no window on said display apparatus, said first window generating unit provides said particular window for display on said display apparatus and, when said first detecting unit detects any window except for said particular window, said first erasing unit erases a displayed said particular window from said display apparatus.

2. A data processing apparatus as claimed in claim 1, wherein said window control unit further comprises:

a second detecting unit detecting whether a particular key on said input apparatus is operated by the user; and a second window generating unit, operatively connected to said second detecting unit, providing said particular window regardless of the presence or absence of other displayed windows when said second detecting unit detects the particular key.

3. A data processing apparatus as claimed in claim 1, wherein said window control unit further comprises:

a third detecting unit detecting a switch instruction sent from said input apparatus to switch an active window;

a first decision unit, operatively connected to said third detecting unit, determining the number of windows displayed on said display apparatus when the third detecting unit detects the switch instruction;

a switch unit, operatively connected to said first decision unit selectively switching the active window; and a first setting unit operatively connected to said first decision unit selectively setting the active window wherein, when the number of windows is two, said first setting unit sets another window to an active state, and when the number of windows exceeds two, said first setting unit sets any one of windows designated by said input apparatus to the active state.

4. A data processing apparatus as claimed in claim 3, wherein said first setting unit displays an identification list of windows which are currently displayed, and selects any one of the windows to be activated in said identification list through said input apparatus to set the active window.

5. A data processing apparatus as claimed in claim 4, wherein said first setting unit eliminates a read only window from being selected as the active window.

6. A data processing apparatus as claimed in claim 1, wherein said window control unit further comprises:

a fourth detecting unit detecting a new instruction to provide a new window;

a reducing unit, operatively connected to said fourth detecting unit, selectively reducing the size of each window which is currently displayed when said fourth detecting unit detects the new window; and a third window generating unit, operatively connected to said reducing unit, providing the new window in a remaining area which is obtained after reduction of windows by said reducing unit.

7. A data processing apparatus as claimed in claim 6, wherein said reducing unit reduces the size of each window by taking into account the arrangement of each window on said display apparatus.

8. A data processing apparatus as claimed in claim 1, wherein said window control unit further comprises:

a fifth detecting unit detecting an erase instruction to erase the window;

a second erasing unit, operatively connected to said fifth detecting unit, selectively erasing the window in which the erase instruction is generated when said fifth detecting unit detects the erase instruction; and an enlarging unit, operatively connected to said second erasing unit, enlarging windows which are not erased.

9. A data processing apparatus as claimed in claim 8, wherein said enlarging unit enlarges the size of each window by taking into account the arrangement of each window on said display apparatus.

10. A data processing apparatus as claimed in claim 8, wherein said window control unit further comprises:

a second decision unit, operatively connected to said second erasing unit and said enlarging unit, determining whether an erased is a last displayed window; and said enlarging unit enlarges windows which are not erased in the previous state when the last displayed window is erased.

11. A data processing apparatus as claimed in claim 1, wherein said window control unit further comprises:

a second setting unit setting an automatic adjusting mode for instructing the automatic adjusting of the distance between windows;

a defining unit, operatively connected to said second setting unit, defining a pair of windows for which an absolute distance between said pair of windows becomes a predetermined value when said second setting unit sets the automatic adjusting mode; and an adjusting unit, operatively connected to said defining unit, adjusting the absolute distance so as to become zero between said pair of windows.

12. A data processing apparatus as claimed in claim 1, wherein said window control unit further comprises:

a third setting unit setting a one-group moving mode in which a plurality of windows move as one group in response to a one-group moving instruction;

a seventh detecting unit, connected to said third setting unit, detecting whether a moving instruction is generated to any one of windows in which the one-group moving instruction is generated when said third setting unit sets the one-group moving mode; and a moving unit, connected to said seventh detecting unit, moving a plurality of windows as one group when said seventh detecting unit detects the moving instruction.

13. A data processing apparatus as claimed in claim 1, wherein said window control unit further comprises:

a fourth setting unit setting a size-following change mode in which the sizes of adjacent windows are changed by following each other;

an eighth detecting unit, operatively connected to said fourth setting unit, detecting whether the window receiving a size-following change instruction has an adjacent window when the size-following change mode is set by said fourth setting unit; and a change unit, operatively connected to the eighth detecting unit, changing the size of the window which receives the size-following change instruction in a state of keeping an adjacent relationship.

14. A data processing apparatus as claimed in claim 1, wherein said window control unit further comprises:

a fifth setting unit setting an exchange mode between windows;

a ninth detecting unit, operatively connected to said fifth setting unit, detecting whether an exchange instruction between windows is generated for any one of windows to be exchanged when the exchange mode is set by said fifth setting unit; and an exchange unit, operatively connected to said ninth detecting unit, exchanging the contents or position of windows to be exchanged when said fifth setting unit detects the exchange instruction.

15. A data processing apparatus as claimed in claim 1, wherein said window control unit further comprises:

a tenth detecting unit detecting whether a display instruction to display hidden windows is generated; and a display unit, operatively connected to said tenth detecting unit, displaying the contents or a window frame of the window which is hidden by a front window when the tenth detecting unit detects the display instruction of the hidden window.

16. A data processing apparatus as claimed in claim 15, wherein said display unit displays the window frame of the front window when displaying contents of a window which is hidden by the front window.

17. A data processing apparatus as claimed in claim 15, wherein said display unit displays sequentially, or at once, the contents of all windows which are hidden by the front window.

18. A data processing apparatus as claimed in claim 1, wherein said particular window is a process selecting window which includes various menus to be selected by a user.

19. A data processing apparatus connected to at least one input apparatus and a display apparatus and including a window control unit and a data processing unit executing data processing using one or more windows displayed on said display apparatus, said window control unit comprising:

a first detecting unit detecting the presence or the absence of at least one window, or the absence of any window displayed on said display apparatus; and a first window generating unit, operatively connected to said first detecting unit, selectively providing a particular window for display on said display apparatus;

wherein, when said first detecting unit detects no window on said display apparatus, said first window generating unit provides said particular window for display on said display apparatus.

20. A data processing apparatus connected to at least one input apparatus and a display apparatus and including a window control unit and a data processing unit executing data processing using one or more windows displayed on said display apparatus, said window control unit comprising:

a first detecting unit detecting the presence of at least one window or the absence of any window displayed on said display apparatus and producing corresponding window presence and window absence outputs;

a first window generating unit, operatively connected to said first detecting unit and, in response to a window absence output thereof, providing a particular window for display on said display apparatus.

* * * * *

UNITED STATES PATENT AND TRADEMARK OFFICE
CERTIFICATE OF CORRECTION

PATENT NO.   : 5,758,111
DATED        : May 26, 1998
INVENTOR(S)  : Shigeo SHIRATORI et al.

It is certified that error appears in the above-identified patent and that said Letters Patent is hereby corrected as shown below:

Col. 3,   line 20, change "a" to --an--.

Col. 5,   line 43, after "with" insert --a--.

Col. 14,  line 64, delete "and";
          line 67, after "window;" insert --and--.

Col. 16,  line 11, after "erased" insert --window--.

Signed and Sealed this

Twenty-seventh Day of October, 1998

Attest:

BRUCE LEHMAN

Attesting Officer        Commissioner of Patents and Trademarks